United States Patent [19]
Chrisley, Jr.

[11] Patent Number: 4,719,716
[45] Date of Patent: Jan. 19, 1988

[54] ROUND DEER STAND

[76] Inventor: Tom H. Chrisley, Jr., Rte. 2, Box 220, Groesbeck, Tex. 76642

[21] Appl. No.: 946,983

[22] Filed: Dec. 29, 1986

[51] Int. Cl.[4] .......................................... A01M 31/02
[52] U.S. Cl. .......................................... 43/1; 52/263
[58] Field of Search .................. 43/1; 52/263; 135/901

[56] References Cited

U.S. PATENT DOCUMENTS

| | | |
|---|---|---|
| 315,297 | 4/1885 | Kenly . |
| 586,145 | 7/1897 | Sievers . |
| 1,031,851 | 7/1912 | January . |
| 1,253,964 | 1/1918 | Hack . |
| 1,545,714 | 7/1925 | Traylor . |
| 2,546,588 | 3/1951 | Ellis ........................................ 43/1 |
| 2,854,705 | 10/1958 | McClaran ................................ 43/1 |
| 2,992,503 | 7/1961 | Webb ...................................... 43/1 |
| 3,018,857 | 1/1962 | Parham ................................... 43/1 |
| 3,406,784 | 10/1968 | Jones ...................................... 43/1 |
| 3,513,605 | 5/1970 | Smith ..................................... 43/1 |
| 3,540,170 | 11/1970 | Flowers .................................. 43/1 |
| 3,744,842 | 7/1973 | Ronning ............................. 297/180 |
| 3,787,912 | 1/1974 | Huey . |
| 3,841,037 | 10/1974 | Clark ..................................... 52/36 |
| 3,848,352 | 11/1974 | Sayles .................................... 43/1 |
| 3,886,678 | 6/1975 | Caccamo ................................ 43/1 |
| 3,902,264 | 9/1975 | Radig ..................................... 43/1 |
| 3,913,598 | 10/1975 | Glutting ............................ 135/4 R |
| 3,936,969 | 2/1976 | Richard .................................. 43/1 |
| 4,045,040 | 8/1977 | Fails ...................................... 43/1 |
| 4,123,869 | 11/1978 | Witt ....................................... 43/1 |
| 4,171,595 | 10/1979 | Tucker ................................... 43/1 |
| 4,186,507 | 2/1980 | Stinnett .................................. 43/1 |
| 4,224,754 | 9/1980 | Derryberry ............................. 43/1 |
| 4,252,136 | 2/1981 | Kruczynski ......................... 135/901 |
| 4,364,193 | 12/1982 | Visco ..................................... 43/1 |
| 4,412,398 | 11/1983 | Harmon .................................. 43/1 |
| 4,506,467 | 3/1985 | Strung ................................... 43/1 |
| 4,606,142 | 8/1986 | Reneau ................................... 43/1 |

Primary Examiner—Gene P. Crosby
Attorney, Agent, or Firm—Marsteller & Associates

[57] ABSTRACT

A portable hunting blind or stand adaptable to rest on a mobile or permanent platform, the blind having a cylindrical cross-section and external frame to avoid obstruction with a hunter's movement. The deer stand comprises a conical overhanging roof resting above a cylindrical wall. The wall has external framework and contains a plurality of radially spaced window apertures; an outside-facing window at each window aperture that is adapted to swing upwardly and outwardly; a connection to allow an inhabitant on the inside of the cylindrical wall to open the outside-facing window; a horizontal gun rest adjoining the inside of the cylindrical wall inside the portable building beneath the window aperture and, an inside-facing window at each of the window apertures adapted to swing upwardly and toward the interior of the cylindrical wall and a window latch adapted to hold the inside-facing window in a vertical position.

16 Claims, 7 Drawing Figures

ROUND DEER STAND

BACKGROUND OF THE INVENTION

1. Field of the Invention

This invention relates to blind shelters or stands used by hunters, photographers, and other outdoor enthusiasts to attain proximity to wildlife, and more particularly to Round Deer Stands which are intended to assist a hunter in viewing and shooting wildlife such as deer.

2. Description of Related Art

The related art comprises U.S. Pat. No. 315,297—Kenly, U.S. Pat. No. 586,145—Sievers, U.S. Pat. No. 1,031,851—January, U.S. Pat. No. 1,253,964—Hack, U.S. Pat. No. 1,545,714—Traylor, U.S. Pat. No. 2,546,588—Ellis, U.S. Pat. No. 2,854,705—McClaran, U.S. Pat. No. 2,992,503—Webb, U.S. Pat. No. 3,018,857—Parham, U.S. Pat. No. 3,406,784—Jones, U.S. Pat. No. 3,513,605—Smith, U.S. Pat. No. 3,540,170—Flowers, U.S. Pat. No. 3,744,842—Ronning, U.S. Pat. No. 3,787,912—Huey, U.S. Pat. No. 3,841,037—Clark, U.S. Pat. No. 3,848,352—Sayles, U.S. Pat. No. 3,886,678—Caccamo, U.S. Pat. No. 3,902,264—Radig, U.S. Pat. No. 3,913,598—Glutting, U.S. Pat. No. 3,936,969—Richard, U.S. Pat. No. 4,045,040—Fails, U.S. Pat. No. 4,123,869/RE 30,605 (11/7/78)—Witt (5/12/81), U.S. Pat. No. 4,171,595—Tucker, U.S. Pat. No. 4,186,507—Stinnett, U.S. Pat. No. 4,224,754—Derryberry, U.S. Pat. No. 4,364,193—Visco, U.S. Pat. No. 4,412,398—Harmon, U.S. Pat. No. 4,506,467—Strung Of the above citations, the more relevant patents are discussed as follows:

U.S. Pat. No. 2,854,705—McClaran teaches a box-shaped, portable, elevated hunting blind having a sliding window in each of the four walls of said blind and discloses an overhanging roof. However, this device provides a limited range of visibility, affords no protection from environmental influences when the window is opened, contains corners which can inhibit mobility within the blind, offers no particular soundproofing elements, and provides no surface for resting or steadying any projectile used by an inhabitant.

U.S. Pat. No. 3,513,605—Smith teaches a substantially circular or cylindrical hunting blind which includes a means for heating said blind and an orbital seat. However, when the inhabitant is completely inside the blind, this device is offers no outward visibility and may not be used to extend any projectiles from the blind.

U.S. Pat. No. 4,171,595—Tucker, and U.S. Pat. No. 4,186,507 teach a portable box-shaped blind shelter having windows and an entry/departure door. However, this rectangular device also includes internal framing and corners which can inhibit an inhabitant's mobility U.S. Pat. No. 4,224,754—Derryberry, U.S. Pat. No. 4,412,398 Harmon and U.S. Pat. No. 4,506,467—Strung teach roof-covered, portable hunting blinds having a largely cylindrical shape and a means for extending a projectile from the blind. However, these blinds offer little to no visibility for the inhabitant, and offer outside access in only one direction.

U.S. Pat. No. 4,364,193—Visco teaches a portable blind of largely cylindrical shape which offers access and visibility around its circumference, in addition to means for assisting the placement of projectiles from within. However, this device fails to offer an overhanging roof or an awning-type feature to shield the inhabitant from environmental influences such as the sun or incoming rain. Furthermore this device employs an internal frame structure which could inhibit the movements of the inhabitant.

The remaining citations show hunting shelter devices or other shelter devices which to a lesser extent reflect upon the present invention.

The instant invention is distinguished over the known prior art by its use of both a cylindrical form and an exterior frame, which leave no corners into which the inhabitant may bump an instrumentality such as a gun, and additionally assists in shedding rainwater from such an instrumentality. The overhanging roof of the instant invention assists in this shedding function. The sun visor effect of the adjustable external windows, acting with the inner plastic window allow the inhabitant visible access to the outside while protecting himself from external influences such as sunlight and rain. The inhabitant further has effective access around the circumference while still protected by the shelter, due to the placement of windows radially about the cylindrical shelter. The carpeted gun rest protects instrumentalities such as a gun from being nicked. A further distinction of the present invention is the option to incorporate a mobile platform which allows the deer stand to be used on most relatively level ground surfaces.

SUMMARY OF THE INVENTION

The present invention generally comprises a cylindrical and portable shelter which may be placed upon a mobile or permanent platform, said shelter having hinged outside windows, a soundproof or sound-reducing interior and exterior framework. The outside windows swing upwardly and outward and provide a sun screen. There is a clear or tinted plastic interior window that is hinged to swing upward and toward the interior. The mobile platform embodiment allows the shelter to be maneuvered to a desired height by the release or retrieval of cable wiring held in tension.

DESCRIPTION OF THE PREFERRED EMBODIMENT(S)

Figure 1:
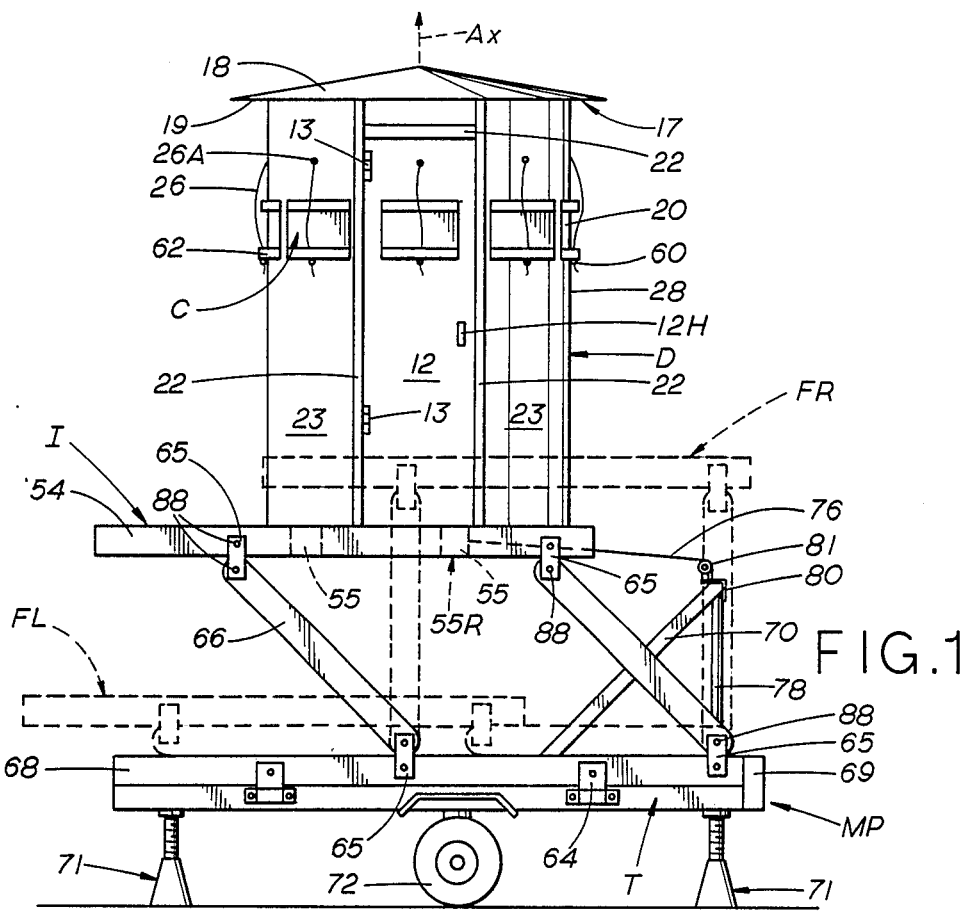
FIG. 1 is a schematic outside view of the Round Deer Stand and mobile platform of the present invention.

As shown in FIGS. 1, and 5 through 7, in a preferred embodiment of the present invention the deer stand or shelter D is tall enough for a typical hunter or inhabitant to stand while inside. In this figure, the outside or storm windows 20 are shown in the lowered or closed position C. Additionally, the external hinges 24 are shown attached to the external or outer windows. The window cord 26 is used to raise, lower and to secure the window in position. Cord 26 is shown extending through the cylindrical wall 28 to its attachment point 60 on the lower outside window frame 62. Latch 33 (FIG. 5) is attached to the inside of the outer window to secure the outer window form opening. Latch 33 is typically the hook portion of a hook and eye latch. The eye may be mounted on the interior of the outer window to secure the hook when the window is raised.

The deer stand D is cylindrical and has its supporting frame 22 of a typical construction on its exterior of panels 23 so that the inhabitant will not likely bump an instrumentality such as a gun butt into a corner when the hunter is taking aim or using the weapon. The supporting frame 22 allows the cylindrical wall 28 to be sectioned vertically into an entrance/exit door 12 with handle 12H without disturbing the smoothness of the interior 10 of the cylindrical wall 28.

Figure 3:
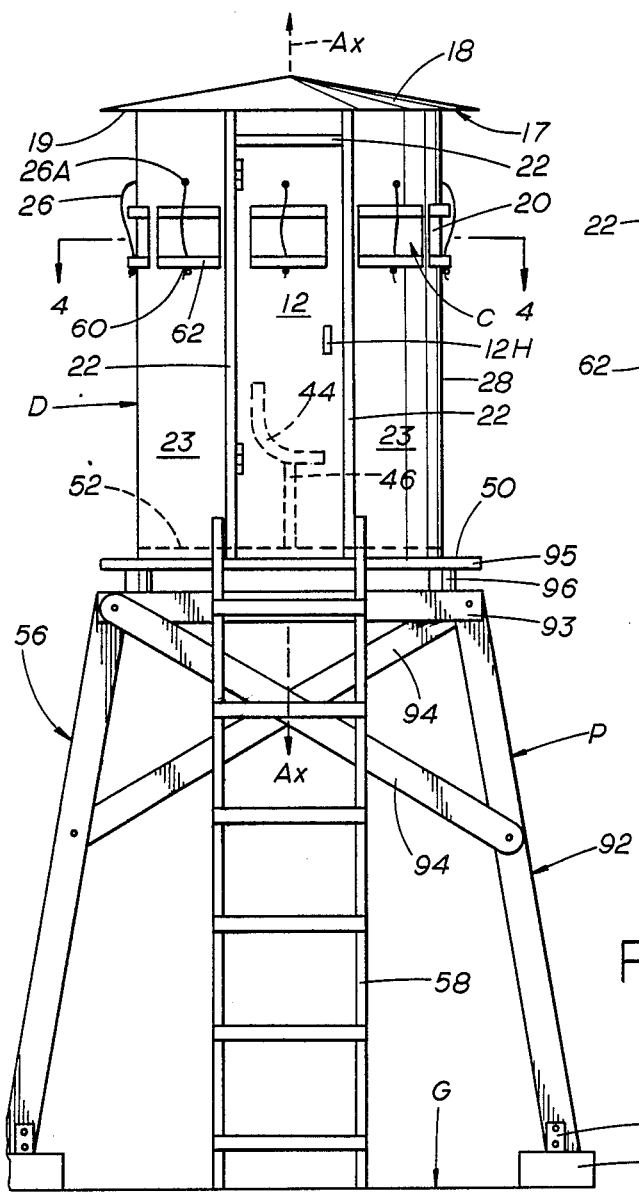
FIG. 3 is a side view of the Round Deer Stand mounted on top of a fixed platform.
Figure 4:
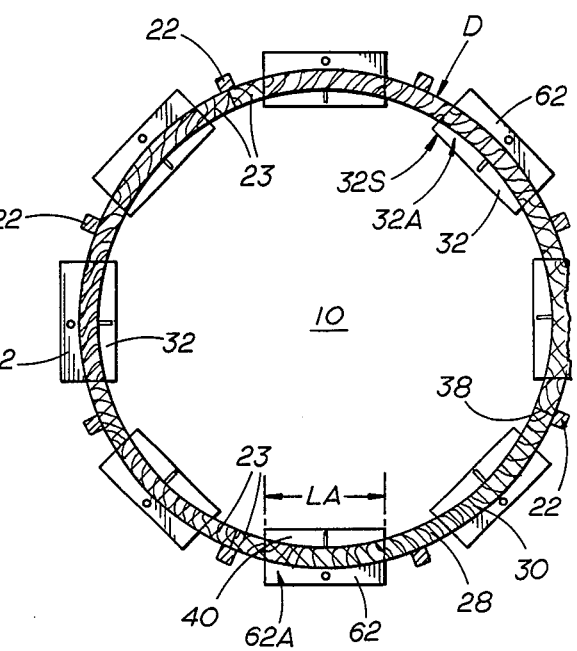
FIG. 4 is a cross-sectional view of the Round Deer Stand, taken along line 4—4 of FIG. 3.

As shown in FIG. 4, in the preferred embodiment of the present invention, there are generally eight window apertures or openings 30 in the deer stand D, spaced radially and generally uniformly about the deer stand D. As shown in FIGS. 1 and 3, the deer stand D has a roof 18 of conical shape extending beyond the top of the cylindrical wall 28 forming eaves 19. The eaves 19 shelter the hunter inside the present deer stand from rain dripping into the stand through an opened window. In the preferred embodiment of the present invention, the roof 18 is made from sheet metal and sprayed with styrofoam or any other sound deadening material 17, such as auto-body undercoat, on the inside to deaden any sound.

Figure 7:
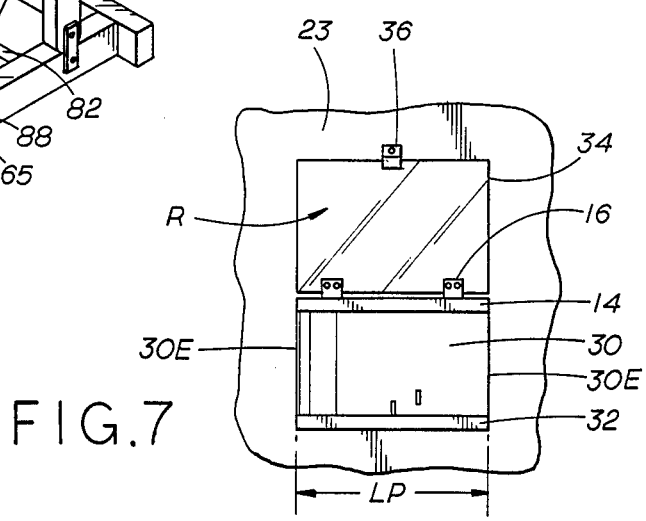
FIG. 7 is a view of a window unit of the Round Deer Stand of the present invention looking outward from the interior.
Figure 5:
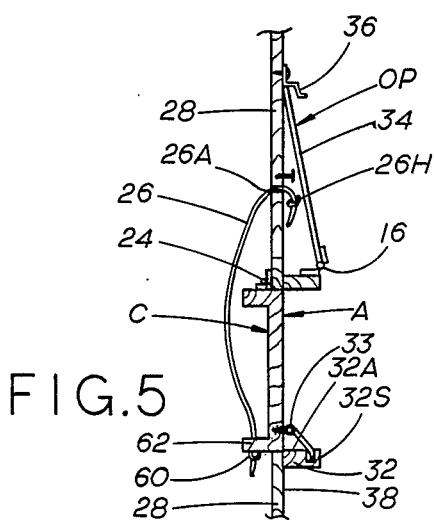
FIG. 5 is one view of a cross section of the window opening showing the outside window in the down or closed position.
Figure 6:
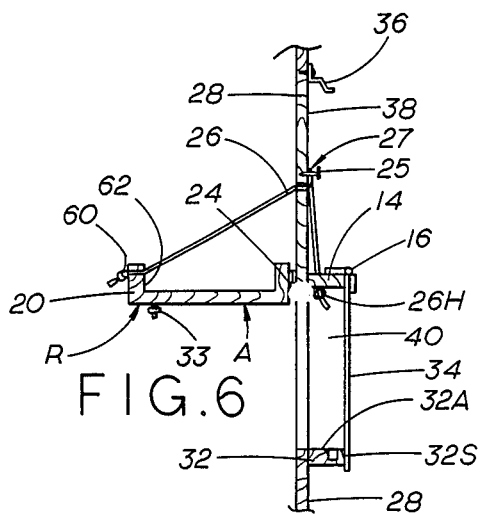
FIG. 6 is a second view of a cross section of the window opening showing the outside window in the open position and the interior window in the closed position.

As shown in FIGS. 5 through 7, each window opening 30 includes an interior gun rest 32 that may be carpeted. In the preferred embodiment of the present invention, the gun rest 32 is covered with an Astro-turf-like material so as to be resilient to the elements as well as providing cushioning for the gun barrel. The gun rest 32 is generally cut from a piece of wood, such as a 2"×4" cross section segment, to fit the interior curvature of the wall 28 and generally extends the width of the window opening 30 (FIG. 7).

An inside window 34 is also located with each of the window openings 30. The inside window permits the hunter to keep the exterior window 20 in an opened position, yet protect the hunter from the outside elements such as the cold or a driving rain. In the preferred embodiment of the present invention, the inside window 34 is made from a transparent, light-weight plexiglass type material permitting the hunter inside the deer stand D to look through the the outside scene. The inside window 34 is mounted to the top block 14 with hinges 16 as will be more fully set forth below.

As shown in FIG. 3, the deer stand D may rest on a fixed platform P or on the mobile platform MP of FIG. 1. Additionally, the deer stand D of the present invention may be merely placed on the ground without any supporting structure raining the platform above the ground height.

Mobile Platform Mounting

Figure 2:
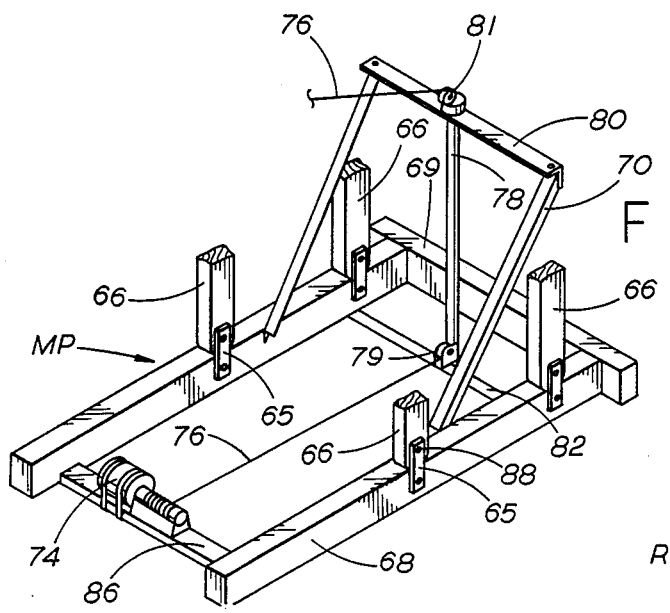
FIG. 2 is a perspective view of the mechanism used to raise the deer stand on the mobile platform.

In the preferred embodiment of the present invention in FIGS. 1 and 2, the mobile platform MP is comprised of an upper section that raises into an upright position and a lower section that is mounted with a typical flatbed trailer T. The upper section or frame is comprised of at least two upper forward support beams 54 which are held spaced apart and in parallel by at least two upper lateral or cross support beams 55 (shown in phantom). The beams 55 are also parallel with each other and arranged perpendicular to the upper forward support beams 54 to form a supporting platform for the deer stand D.

Similarly, the lower section is formed from at least two lower forward support beams 68 which are held in parallel by lower lateral or cross support beams 69 which are parallel with each other and perpendicular to the lower forward support beams 68.

Pivoting vertical support member 66 have rounded ends for pivoting and extend between the upper section and the lower section. Pivot member 66 are attached at their lower end to the lower section with brackets 65 as well as having their upper ends attached to the upper section with like brackets 65. Pins 88 secure the brackets 65 to the members 66 and are the points about which the pivot members 66 pivot. When the pivoting support members 66 are in the full upright position, a box-like structure is formed with the deer stand D supported on the upper section extending the height of the pivoting members 66 above the trailer T.

A horizontal stabilizing bar 80, guide pipe 78 and brace 70 are mounted to the lower section and provide the guide means for a motorized or hand cable crank or winch 74 and cable 76 that raise or lower the upper section. The lower end of the guide pipe 78 is mounted to a cross member 82 while the upper end of the guide pipe 78 is fixed to the horizontal stabilizing bar 80. A winch 74 rests upon a cross brace or crank support member 86 placed between and secured to the lower forward support beams. A cable 76 of suitable strength is attached at one of its ends to the winch 74 and runs essentially horizontally from the winch 74 to a lower sheave guide 79, which directs the cable upwardly through the interior of the vertical guide pipe 78. The cable 76 exits from the pipe 78 at the upper sheave 81 that directs the cable 76 toward the attachment point on the upper section at the upper lateral support beam 55R. Thus, by winching in the cable, that is by making the extended portion of the cable shorter, the hunter is able to raise the upper section into the full upright position.

Generally, the trailer T has a plurality of wheels 72 and a plurality of mounting brackets 64 that secure the lower section of the mobile platform MP to the trailer T. Adjustable jacks 71 attached to the front and to the rear further support the trailer T and level the trailer on uneven ground.

Fixed Platform Mounting

The fixed platform mounted in the ground G is shown in FIG. 3. The fixed platform may be assembled in a lowered position and raised into the full upright position similarly to the mobile platform MP.

Cement blocks 91 secure braces 90. The cement blocks 91 are firmly attached to or mounted on the ground G. Vertical members 92 are mounted at one of their ends to the bracket 90 and at the upper end to an support member 93. If the deer stand D is mounted on the fixed platform P before it is erected, then cross braces 94, extending between two vertical members 92, are not attached at both of their ends. In that event, the vertical members would then be pivoted about braces 90 into the upright or essentially vertical positions, and then both ends of cross braces 94 would be attached. The raising and lowering of the fixed platform would, in many ways, resemble the sequence that the mobile platform follows through positions FL, I, and FR shown in FIG. 1.

Typically, the round deer stand D of the present invention rests on a base 95 supported by timbers 96. FIG. 3 shows the deer stand D mounted on the base 95, which is mounted on top of the support member 93 of the fixed platform P.

OPERATION

As shown in the figures, the windows openings 30 are preferably spaced uniformly about the circumference of the round deer stand D to effectively allow the inhabitant or hunter clear access to the outside hunting area in any direction. The benefit of the uniform pattern of the windows permits the hunter to view the outside despite the direction of external influences such as rain or the direction of the sunlight.

As shown in FIG. 6, the outside window 20 may further benefit the hunter in the deer stand D by serving in the manner of an adjustable sun visor or awning, protecting the shelter D from both rain and the sunlight at sunset.

As is shown in the various configurations of the inside and outside windows in FIGS. 5 through 7, the inhabitant may silently adjust the outside window 20 to a desired position raised position R (FIG. 6) or closed positioned C (FIG. 5) by pulling the window cord or rope 26 through a fitted aperture or hole 27 through the wall 28 by the rope handle or knot 26H in order to maximize the effectiveness of the outside window 20. FIG. 6 also shows a nail 25 placed into the hole 27 locking the rope 26 into the fixed position and securing the window 20 in the upward or raised position. FIGS. 4 and 6 show that when the outside or external window 20 is lifted, the raised window 20 creates an awning A which causes any rainwater to fall to either side S of said window 20, thus preventing the water from pouring onto the gun of the inhabitant. Additionally, the radial extension of the cylindrical wall 28 and the conical roof 18 combine with the outside windows 20 to shed rainwater away from the windows so as to keep the hunter from the elements.

An important feature of the present invention is the transparent plastic inner window 34, which allows the inhabitant to view outside when the external window 20 is in the raised position R, while still protecting the inhabitant and the interior of the deer stand D from external influences such as rain. An air space 40 is created between the inner window 34 and the closed outside window 20.

As shown in the figures, in the preferred embodiment of the present invention, the shelter D becomes effectively weatherproof when the inner or inside window 34 extend from one side of the opening 30E to the other side 30E.

FIGS. 5 through 7 show that the inside window 34 has inside hinges 16 which allow rotation about a horizontal planar top surface or block 14 that, like the gun rest 32, extends along the inside curvature of the wall 28 across the width of the window opening (from one side 30E to the other side 30E in FIG. 7). A clamp or latch 36 attached to the inside of the wall 38 affixes the inside window to the inside wall 38 to lock said windows 34 into an opened position. In the preferred embodiment of the present invention, latch 36 is a spring-type latch that operates quietly so as not to disturb the hunted prey outside the deer stand.

The carpeted gun rests 32, located horizontally beneath the inside windows 34, protect the gun barrels from being nicked, and additionally reduce noise from the impact of placing the barrel onto the area of the window opening 30. As shown in FIG. 4, these gun rests 32 have one arc-shaped end 32A shaped in conformity with the interior curvature of the inside cylindrical wall 38 and have one straight end 32S extending toward the center axis AX of said deer stand D. The planar top surface 14 has generally the same dimensions as said planar gun rest surface 32, horizontally adjoining said cylindrical wall 28 inside said deer stand D directly above said window aperture. Likewise the exterior lower window frame 62 has a complementary curved side 62A (FIG. 3), which permits both the gun rest 32 and the lower exterior window frame 62 to be formed from the same piece of stock, such as a piece of 2"×4" cross-section lumber.

In another embodiment of the present invention, the straight end 32S of the horizontal gun rest 32 has a length LP which exceeds to a minor extent the horizontal length LA of the plane bordered by the vertical edges 30E of the window aperture 30 at both sides of window aperture 30. This dimensional configuration allows an air space 40 to exist between the inside window 34 and the aperture 30, thus preserving good visibility by preventing condensation from building up on the inside window, in addition to allowing fresh air to circulate through the deer stand D.

In the preferred embodiments of the present invention, the floor 50 is padded and covered with a carpet material 52 (shown in phantom in FIG. 3) such as astroturf to reduce noise from foot movement. As is also shown in phantom in FIG. 4, a seat 44 may be placed inside the deer stand D. This seat 44 should desirably be mounted on a swivel 46 with nylon bearings, allowing the inhabitant to turn 360 degrees in complete silence.

As shown in FIG. 1, in one embodiment of the present invention, the deer stand D may be placed upon a mobile platform MP having wheels 72 at its bottom for portable use. As shown in FIG. 1, and FIG. 2, when the cable 76 is tightened or loosened by the cable crank 74, the tension from the cable causes the rear upper lateral support beam 55R to be brought in the direction of the guide pipe 78. The movement of the rear upper lateral support beam 55R causes the upper section of the mobile platform MP to be raised or lowered (if cable is let out from the winch) to a desired height. FIG. 1 shows the mobile platform MP in its flat position FL in phantom. FIG. 1 shows the mobile platform MP in an intermediate position I as well as showing the mobile platform MP in its fully raised position FR in phantom. At all positions FR, I, or FL, the cable crank 74 desirably maintains tension in the cable. Supported by braces 70, the horizontal stabilizer bar 80 provides additional support in addition to the tension in the cable 76 to maintain the mobile platform in the fully raised position.

In the fixed and raised embodiment of the present invention (FIG. 3), the deer stand D may be placed upon a permanent platform 56 for permanent use. The permanent platform 56 may be raised in much similar manner as the mobile platform MP. In either case, a ladder 58 may be used to enter the deer stand D from the ground. As shown in FIGS. 1 and 3, the deer stand D may be entered or exited through the entrance/exit door 12 which opens conventionally about door hinges 13 placed on the supporting or external frame 22.

The foregoing disclosure and description of the invention are illustrative and explanatory thereof, and various changes in the size, shape and materials, as well as in the details of the illustrated construction may be made without departing from the spirit of the invention.

I claim:

1. A round hunting blind for concealing the presence of at least one hunter stalking game of the type having an enclosure having a peripheral wall forming essentially an upright cylinder; a roof attached to the upper end of the upright cylinder and extending over the edges of said wall; exterior framing supporting the peripheral wall; a floor member attached to the lower end of the upright cylinder; an entrance door formed in the wall; at least two window openings formed in the peripheral wall at a desired height suitable for the hunter; the invention comprising:

an outer window having one edge mounted to the exterior surface of the peripheral wall and having essentially the same curvature of the peripheral wall and dimensions of the window opening; said window fitting into the window opening formed in the peripheral wall; said outer window opening toward to outside of the peripheral wall; and, an essentially transparent inner window mounted to the interior of the peripheral wall; said inner window essentially covers the window opening; and, said inner window opens toward the interior of the peripheral wall;

wherein the outer window may be opened independently of the inner window, and which inner window protects the hunter from the weather outside of the blind, while providing a clear view outside of the blind for the hunter.

2. The invention of claim 1, further including a gun rest mounted to the interior of the peripheral wall beneath the window opening.

3. The invention of claim 1, further including:

a block mounted to the interior of the peripheral wall above the opening; said block having an essentially straight side facing the interior of the blind;

a catch means mounted on the interior of the peripheral wall for securing the interior window when the interior window is opened by the hunter.

4. The invention of claim 3, further including a hinge joining the upper portion of the interior window to the straight side of the block.

5. The invention of claim 1, further including rope means for raising the outer window, said rope means extending from the interior of the blind through the peripheral wall above the window opening and attached to the lower portion of the outer window; whereby the hunter inside the blind pulls the end of the rope means inside the blind causing the outer window to open.

6. The invention of claim 1 further including a pivotally mounted seat mounted in the interior of the upright cylinder and attached to the floor member.

7. A mobile platform mounted hunting blind of the type having a hunting blind for concealing the presence of at least one hunter stalking game, comprising:

a trailer member having a supporting base mounted on wheels for supporting cargo while in transit;

a lower support base mounted with the supporting base of the trailer member;

an upper support base for mounting the hunting blind;

at least two arms extending between the lower support base and the upper support base; said arms pivotally attached to sid lower support base and said upper support base;

winch and cable means extending between the lower support base and the upper support base to controllably raise or lower the upper support base.

8. The invention of claim 1 further including:

a trailer member having a supporting base mounted on wheels for supporting cargo while in transit;

a lower support base mounted with the supporting base of the trailer member;

an upper support base for mounting the hunting blind;

at least two arms extending between the lower support base and the upper support base; said arms pivotally attached to said lower support base and said upper support base;

winch and cable means extending between the lower support base and the upper support base to controllably raise or lower the upper support base.

9. A platform mounted hunting blind of the type having a hunting blind for concealing the presence of at least one hunter stalking game, comprising:

a plurality of essentially upright legs arranged in a generally rectangular relationship;

the lower end of said upright legs pivotally attached to a ground support and the upper end of said upright legs pivotally attached to an upper base member;

the hunting blind is mounted to said base member; and, detachably mounted cross braces extending between adjacent legs on each side of the blind;

whereby, the blind is pivotally raised into position before the cross braces are attached forming a rigid structure.

10. The invention of claim 1 further including:

a plurality of essentially upright legs arranged in a generally rectangular relationship;

the lower end of said upright legs pivotally attached to a ground support and the upper end of said upright legs pivotally attached to an upper base member;

the hunting blind is mounted to said base member; and, detachably mounted cross braces extending between adjacent legs on each side of the blind;

whereby, the blind is pivotally raised into position before the cross braces are attached forming a rigid structure.

11. A round hunting blind for concealing the presence of at least one hunter stalking game comprising:

an enclosure having a peripheral wall forming essentially an upright cylinder;

a roof attached to the upper end of the upright cylinder and extending over the edges of said wall;

exterior framing supporting the peripheral wall;

a floor member attached to the lower end of the upright cylinder;

an entrance door formed in the wall;

at least two window openings formed in the peripheral wall at a desired height suitable for the hunter;

an outer window having one edge mounted to the exterior surface of the peripheral wall and having essentially the same curvature of the peripheral wall and dimensions of the window opening; said window fitting into the window opening formed in the peripheral wall; said outer window opening toward to outside of the peripheral wall; and, an essentially transparent inner window mounted to the interior of the peripheral wall; said inner window essentially covers the window opening; and, said inner window opens toward the interior of the peripheral wall;

wherein the outer window may be opened independently of the inner window, and which inner window protects the hunter from the weather outside of the blind, while providing a clear view outside of the blind for the hunter.

12. The invention of claim 11, further including a gun rest mounted to the interior of the peripheral wall beneath the window opening.

13. The invention of claim 11, further including:
a block mounted to the interior of the peripheral wall above the opening; said block having an essentially straight side facing the interior of the blind;
a catch means mounted on the interior of the peripheral wall for securing the interior window when the interior window is opened by the hunter.

14. The invention of claim 13, further including a hinge joining the upper portion of the interior window to the straight side of the block.

15. The invention of claim 11, further including rope means for raising the outer window, said rope means extending from the interior of the blind through the peripheral wall above the window opening and attached to the lower portion of the outer window; whereby the hunter inside the blind pulls the end of the rope means inside the blind causing the outer window to open.

16. The invention of claim 11 further including a pivotally mounted seat mounted in the interior of the upright cylinder and attached to the floor member.

* * * * *

UNITED STATES PATENT AND TRADEMARK OFFICE
CERTIFICATE OF CORRECTION

PATENT NO. : 4,719,716

DATED : Jan. 19, 1988

INVENTOR(S) : Tom H. Chrisley

It is certified that error appears in the above-identified patent and that said Letters Patent is hereby corrected as shown below:

Column 3, line 53 of the Patent, delete the first "the" before the phrase "the the" and substitute --to-- therefor.

Column 4, line 13 of the Patent, change "member" to --members--.

Signed and Sealed this

Thirteenth Day of September, 1988

Attest:

DONALD J. QUIGG

Attesting Officer

Commissioner of Patents and Trademarks